No. 749,180. PATENTED JAN. 12, 1904.
W. A. GALLOWAY.
SURGICAL PAN.
APPLICATION FILED SEPT. 17, 1902.
NO MODEL.

WITNESSES:
Hood Adomson
C. S. Harris

INVENTOR
William A. Galloway
BY
ATTORNEY

No. 749,180. Patented January 12, 1904.

UNITED STATES PATENT OFFICE.

WILLIAM A. GALLOWAY, OF XENIA, OHIO.

SURGICAL PAN.

SPECIFICATION forming part of Letters Patent No. 749,180, dated January 12, 1904.

Application filed September 17, 1902. Serial No. 123,798. (No model.)

*To all whom it may concern:*

Be it known that I, WILLIAM A. GALLOWAY, a citizen of the United States, and a resident of Xenia, Greene county, Ohio, have invented certain new and useful Improvements in Surgical Pans, of which the following is a full, clear, and exact description.

The object of my invention is to provide a suitable and convenient pan for surgical and obstetrical work, my device being constructed by having a new and novel drainage-conduit extending from the pan and said conduit being so constructed as to permit itself to be quickly formed into a suitable trough for drainage and having the property of retaining that shape until changed.

To accomplish my purpose, I employ a surgical pan having inflatable sides and back with a bottom attached. I employ a novel method of attaching the bottom to the sides and back. The bottom as constructed in the device stands out from the inflatable sides and back and is thereby always readily cleansed. To this bottom is attached or made integrally with it, if preferred, a flap extension, as shown, which is capable of being quickly formed into a conduit of any shape desired and which will retain the same form until changed.

For a more complete description I refer to my drawings hereto annexed and made a part hereof.

Figure 1:
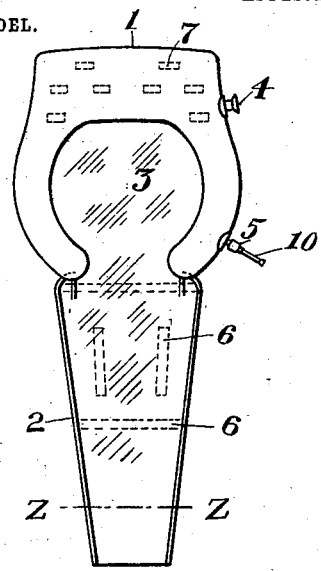
Figure 2:
Figure 3:
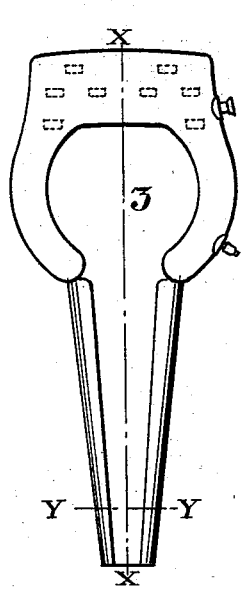
Figure 5:
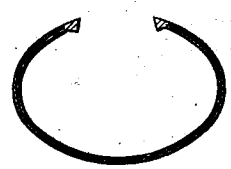
Figure 6:
Figure 4:
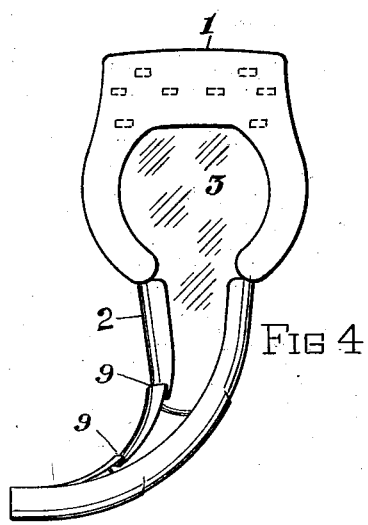

Figure 1 shows a top view. Fig. 2 shows a half-section of the device on the line X X of Fig. 3. Fig. 3 shows the device with the flap 2, with its sides turned upward and inward, forming a trough-like conduit. Fig. 4 shows the device with the drainage-conduit 2 in another position. Fig. 5 is a sectional view on the line Y Y of Fig. 3, and Fig. 6 is a sectional view on the line Z Z of Fig. 1.

In the drawings, 1 is the inflatable rim, which composes the sides and back of the pan.

3 is the bottom and is attached in the novel manner (indicated by 8) to the inflatable rim. To the bottom 3 is attached an extension-flap 2 for the purpose of providing a suitable drainage-conduit for the pan. This flap 2 may be attached to 3, or it may be formed integrally with it.

4 is a water-valve used for filling the inflatable rim with water.

5 is a valve used to inflate the rim with air, and for the sake of cleanliness and convenience a detachable mouthpiece 10 is used in connection with 5.

6 represents ribs used to aid in forming the drainage-conduit into the desired shape, and to give the proper shape to the back of the pan I employ stays 7.

Attention is especially called to the manner of attaching the bottom to the inflatable sides and back. It will be observed that the bottom at its line of attachment stands out from the sides and back, and thereby is rendered readily cleansable by avoiding any creasing where the bottom and rim join, as is ordinarily encountered in this class of goods.

In the use of surgical pans it is necessary to provide a suitable means for draining the pan, and it is with this in view I have constructed my device so that the drainage-conduit may be formed into a trough in any shape desired and curved as indicated in Fig. 4, or it may be rolled up at its sides, as shown in Fig. 3, or it may be left flat, as in Fig. 1, and in each instance the formation will be retained or can be readily and quickly changed from one to the other, this giving opportunity to make a perfect drainage of all fluids away from the pan and after use to quickly flatten the conduit and, as in Fig. 1, have a flat surface for cleansing. This property of conformation above referred to is accomplished by means of ribs of metallic or other material which is flexible or easily bent attached to the drainage-conduit. These ribs being of suitable strength and dimensions are capable of being bent into suitable shape to facilitate drainage from the pan and to aid in getting the best conformity of the drainage-conduit to the surface on which it rests.

I disclaim anything which is described or shown in the patent to Forsyth, No. 622,889, as I do not claim anything for sheet material, for packing, or for matting and the like.

The water-strip which connects the bottom of the pan with the inflatable rim is a solid bar or rod of rubber, against the upper and lower faces of which the rim and the bottom of the pan are secured, this bar of course being bent to conform to the pan. The waterstrip forms an abrupt wall connecting the bottom portion with the inflatable rim and serves to hold the bottom portion and the rim in spaced relation, so that after use of the pan it can be readily cleansed and sterilized. This is in distinction to the ordinary arrangement, wherein the inflatable rim is attached directly to the bottom of the pan, with the result of a very small angle into which matter is forced or works its way and from which it can be removed only with great labor.

Having described my invention, what I claim is—

1. In a surgical pan, a drainage-conduit of flexible material having transverse spaced strips of a material of lesser flexibility and adapted to hold the conduit in transversely-curved shape, said conduit between the strips being adapted to be bent longitudinally.

2. A surgical pan having a drainage-conduit extending from it and said conduit being constructed of soft rubber or suitable material in which are arranged flexible ribs to hold said conduit in any form into which the ribs may be bent by the operator.

3. A surgical pan comprising a bottom portion, an inflatable rim and an abrupt wall connecting the bottom with the rim, said wall holding the rim in spaced relation to the bottom.

4. A surgical pan constructed of soft rubber or other suitable material having a drainage-conduit, in which flexible ribs are placed to hold said conduit in any form into which the ribs may be bent by the operator.

5. A surgical pan comprising a bottom, an inflated rim and a drainage-conduit extending from said bottom, said conduit being of flexible material and having transverse strips spaced longitudinally thereof, said strips being of a material of lesser flexibility than the conduit and adapted to hold the latter in transversely-curved shape.

6. A surgical pan having an inflatable rim, a bottom attached to said rim in such manner as to cause said bottom to stand out from said rim at their line of joining, a conduit for drainage extending from said bottom and being constructed of soft rubber or suitable material in which are arranged flexible ribs to hold said conduit in any form into which the ribs may be bent by the operator.

7. A surgical pan consisting of the following instrumentalities, an inflatable rim having valves for inflation, a suitable bottom attached thereto, a drainage-conduit extending from said bottom and being constructed of soft rubber or suitable material in which are arranged flexible ribs to hold said conduit in any form into which the ribs may be bent by the operator.

8. A surgical pan comprising a bottom portion, an inflatable rim and a separate waterstrip secured between the rim and the bottom and forming an abrupt wall between the rim and bottom.

9. A surgical pan having an inflatable rim and valves for inflation, said rim being enlarged at its back part and held when inflated, by stays or other suitable means, into a flattened back-rest pad, a suitable bottom attached to said rims, a conduit for drainage extending from said bottom and constructed of soft rubber or other suitable material in which are arranged flexible ribs to hold said conduit in any form into which the ribs may be bent by the operator.

In testimony whereof I have hereto set my hand to this specification at Xenia, Ohio, in the presence of two witnesses, this 23d day of August, 1902.

WILLIAM A. GALLOWAY.

In presence of—
W. L. MILLER,
M. J. HARTLEY.